United States Patent [19]

Markham et al.

[11] 4,004,252

[45] Jan. 18, 1977

[54] SAFE DEPOSIT APPARATUS, WITH SELECTIVE PLATE AND SHIELD FOR DUAL FUNCTION DEPOSITORY

[76] Inventors: Michael H. Markham, 2642 Islington Ave.; Joseph Varga, 61 Richview Road, No. 1910, both of Toronto, Ontario, Canada

[22] Filed: Oct. 14, 1975

[21] Appl. No.: 622,136

[52] U.S. Cl. .................................. 232/44; 232/52; 232/60

[51] Int. Cl.² .......................................... B65G 11/04

[58] Field of Search .................. 232/44, 60, 61, 55, 232/57, 57.5, 52

[56] References Cited

UNITED STATES PATENTS

| | | | |
|---|---|---|---|
| 2,921,735 | 1/1960 | Blauvelt | 232/44 |
| 3,092,308 | 6/1963 | Barnhart | 232/57 |
| 3,762,634 | 10/1973 | Leipelt | 232/60 X |

FOREIGN PATENTS OR APPLICATIONS

| | | | |
|---|---|---|---|
| 1,302,026 | 9/1969 | Germany | 232/44 |
| 475,498 | 11/1937 | United Kingdom | 232/44 |

*Primary Examiner*—Roy D. Frazier
*Assistant Examiner*—Peter A. Aschenbrenner

[57] ABSTRACT

The invention provides a dual function safe deposit apparatus which may be operated either without a key to receive envelopes and deposit them in one compartment, or with a key to receive wallets and deposit them in another compartment. The apparatus has an opening to receive deposits, the opening being equipped with a withdrawable shield having a slot for the receipt of envelopes, withdrawal of the shield to provide a larger opening for wallets being key controlled and linked with movement of a diverter member which diverts wallets, deposited while the shield is withdrawn, into a separate compartment from that into which envelopes, inserted through the slot in the shield, are delivered.

4 Claims, 5 Drawing Figures

SAFE DEPOSIT APPARATUS, WITH SELECTIVE PLATE AND SHIELD FOR DUAL FUNCTION DEPOSITORY

FIELD OF THE INVENTION

This invention relates to safe deposit apparatus, and more particularly to apparatus of the kind which serves the dual purposes of receiving either envelopes through a freely available slot opening of limited size, or wallets through a key controlled opening of larger size.

REVIEW OF THE PRIOR ART

Existing dual function safe deposit apparatus of the type referred to above has the disadvantage that both envelopes and wallets, and indeed anything which may be introduced into the deposit apparatus, all enter the same compartment. This is not a desirable feature, since such deposit apparatus sometimes attracts the attention of vandals who deposit through the slot such items as lighted matches, cigarettes or even explosives. In a conventional single purpose deposit apparatus for wallets, access is only available to key holders, and this problem does not therefore arise, whereas with dual function deposit apparatus, foreign matter maliciously introduced will be deposited in amongst the wallets which usually are of greater cash value than the envelopes. Moreover, financial institutions prefer that the envelopes and wallets be deposited in separate compartments.

SUMMARY OF THE INVENTION

The present invention provides apparatus of relatively simple construction which provides the dual function discussed above with a single opening, yet effectively separates items introduced under key control from those deposited through the free access slot. This is achieved by providing an access slot. This is achieved by providing an access opening to the deposit apparatus which is normally closed by a key controlled shield except for a slot of limited dimensions to accept envelope deposits, the shield being operatively linked to a diverter member which diverts deposits to one of the other of two separate compartments according to the position of the shield.

In a preferred arrangement the shield is part cylindrical in form and is arranged coaxially with a rotary depository drum having a peripheral opening, the drum being rotatable between a position in which the peripheral opening is aligned with an opening to the exterior of the apparatus which normally closed by the shield and a discharge position in which its contents are discharged towards the deposit receiving compartments. The shield is connected by a linkage to a pivotally mounted diverter member, so that the latter assumes a position closing the entrance to the one compartment when the shield closes the exterior opening of the apparatus, and a position closing the entrance to the other compartment when the shield is withdrawn from the exterior opening of the apparatus.

SHORT DESCRIPTION OF THE DRAWINGS

An exemplary embodiment of the invention is described below with reference to the accompanying drawings, in which:

FIG. 1 is a perspective view of a safe deposit apparatus in accordance with the invention, from the rear and one side, and with parts broken away so as to show more clearly the internal mechanism, FIG. 2 is a part elevational, part sectional side view of a portion of the apparatus, illustrating the insertion of an envelope, FIG. 3 is a vertical section through the apparatus illustrating its condition after insertion of an envelope.

FIG. 4 is a view corresponding to that of FIG. 2, but illustrating the insertion of a wallet, and FIG. 5 is a view corresponding to FIG. 3 but showing subsequent stages in the deposit of a wallet.

DESCRIPTION OF THE PREFERRED EMBODIMENT

Figure 1:
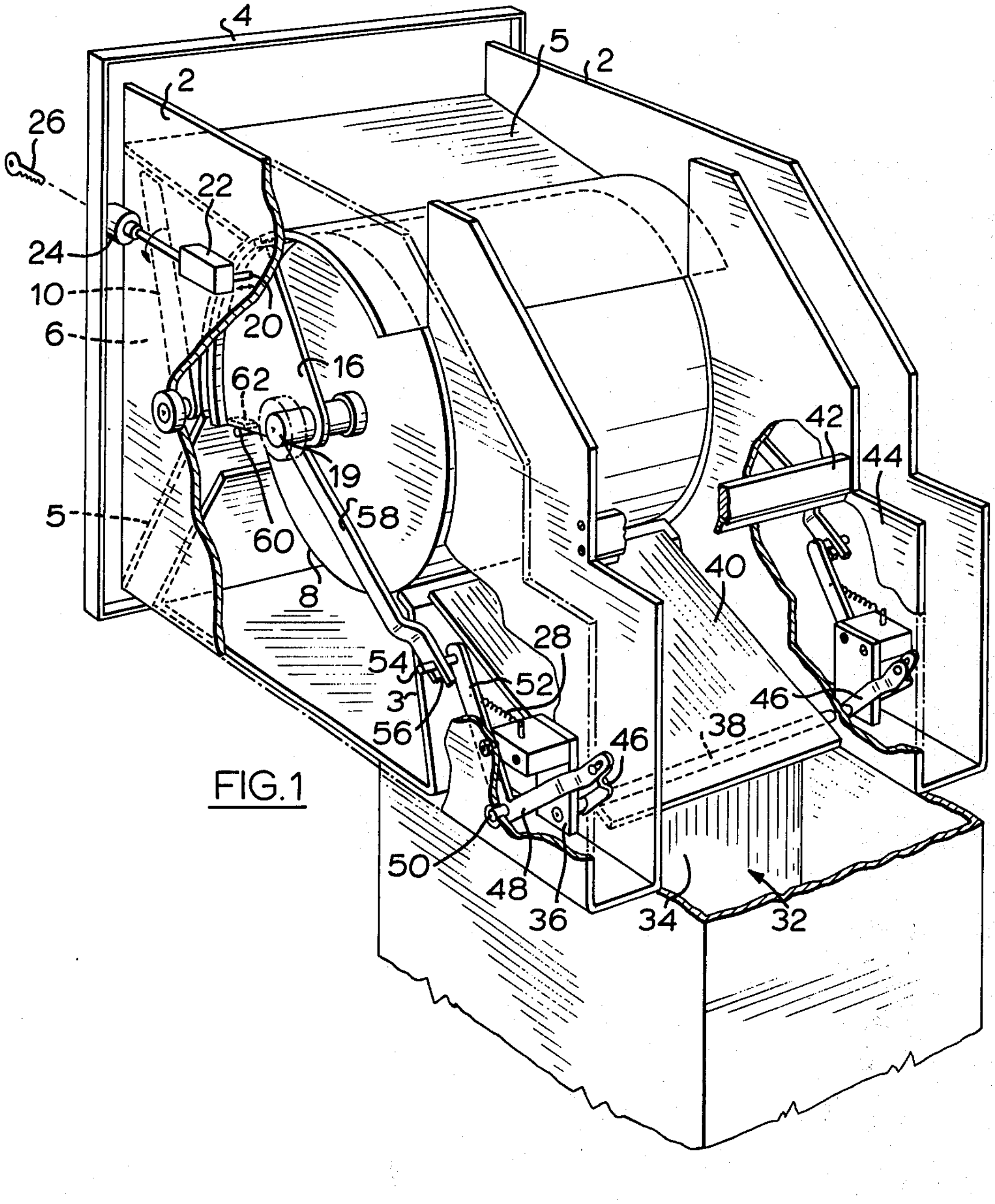

In the drawings, the invention is illustrated as applied to a safe deposit constructed as described in my U.S. Pat. No. 3,784,090, issued Jan. 8, 1974. However, although this construction of deposit apparatus has advantages as set out in that patent, it should be understood that the present invention is equally applicable to other types of deposit apparatus.

The apparatus illustrated comprises a frame having side members 2, a cross member 3 joining the side members, a fascia 4 secured to the side members and defining an entrance opening 6 by means of inturned portions 5 joined to the side members. A rotary depository drum 8 is journalled between the side members adjacent the entrance opening 6, and a door 10 normally closes the entrance opening 6. In operation, the door 10 is pulled down by an intending depositor, the door being mechanically linked to the depository drum 8 so that as the door is pulled down, the drum 8 is rotated to bring an opening 12 into alignment with the opening 6 so as to receive a deposit. Release of the door 10 allows the drum 8, which may be either manually driven or power assisted in its operation, to rotate through about 180° to a discharge position in which the opening 12 is oriented to discharge the deposit towards a receiving compartment. In order to assure discharge of the deposit, and to achieve various other advantages set out in more detail in U.S. Pat. No. 3,784,090 referred to above, the drum incorporates a piston mechanism 14 which is actuated so as positively to discharge the deposit. The mechanism operating this piston and the details of its construction form no part of the present invention, and will not be described.

Thus far, the features described are those of known deposit apparatus. However, in apparatus according to the invention, a shield member 16 in the form of a segment of a cylinder is mounted for independent rotational movement on pivots 19 which also mount the drum 8 between the side members 2. The shield member 16 is formed with an envelope receiving slot 18, and is normally locked to one of the side members 2 by a locking pin 20 withdrawable from an aperture in the shield by means of an actuator 22 under the control of a lock 24 operated by a key 26. When the locking pin 20 is withdrawn, the shield is biased towards a lower position, shown in FIGS. 4 and 5, by its own weight and by springs 28 acting through linkages which are described further below.

On the discharge side of the depository drum 8 are situated entrances 30 and 32 of two separate deposit receiving compartments, one for wallets and the other for envelopes. Above a dividing wall 34 between the two compartment entrances are pivot blocks 36 in which is journalled a shaft 38 supporting a diverter member in the form of a plate 40. The plate 40 is pivotable between a first position, shown in FIGS. 1 to 3, in which it abuts against the cross member 3 and closes the entrance 30, and a second position, shown in FIGS. 4 and 5, in which it abuts a further cross member 42, extending between inturned portions 44 of the side members 2, and closes off the compartment entrance 32 as well as acting to deflect deposits into the entrance 30. The deflector plate 40 is actuated by means of lever arms 46 having pin and slot connections to the one arms 48 of bell-crank levers secured by pivots 50 to each of the members 2. Pins 54 on the other arms 52 of the bell-crank levers engage open ended slots 56 in the ends of arm 58 integral with the ends of the shield member 16. All these linkage parts are housed between the side members 2 and their associated inturned portions 44.

Figure 3:
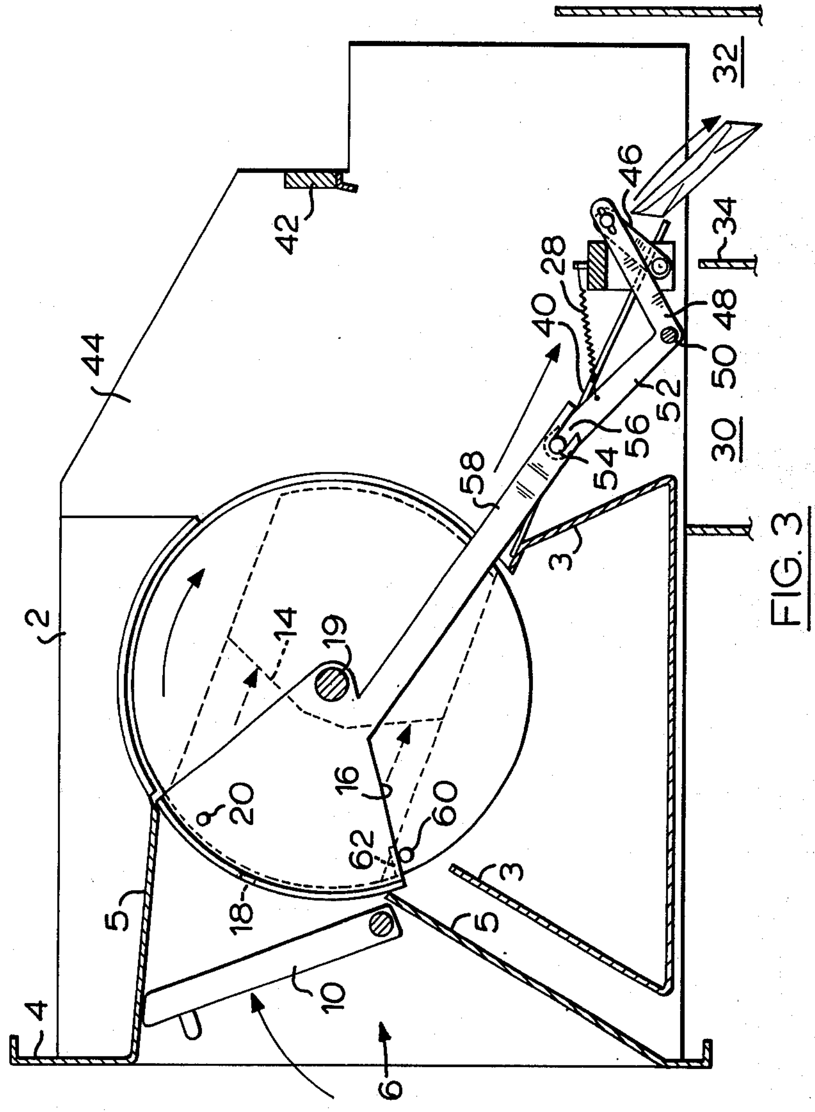
Figure 2:
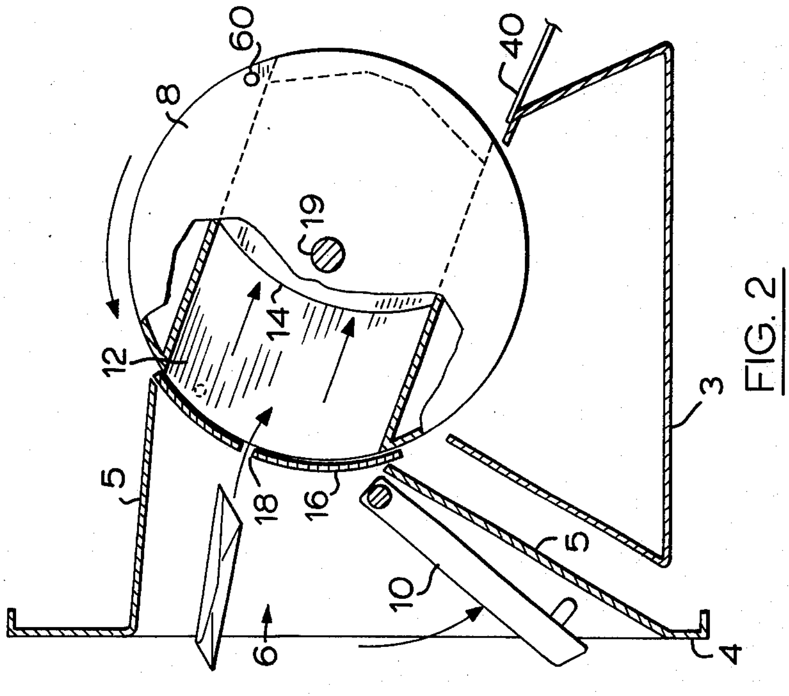

When the shield is in its normal position as shown in FIGS. 1 to 3, the pins 54 are received in the slots 56 and position the bell-crank levers so as to hold the levers 46 in positions locking the diverter member 40 over the entrance 30. Thus so long as the shield 16 remains in its normal position, any deposits made through the slot 16 can only be discharged from the drum 8 into the entrance 32 to the envelope deposit receiving compartment. If a depositer who possesses a key 26 wishes to deposit a wallet, he uses his key in the lock 24 to operate the actuator 22 and withdraw the locking pin 20. This releases the shield 16, which, under the influence of its own weight and of the action of the springs 28 drops towards the position shown in FIGS. 4 and 5.

Figure 5:
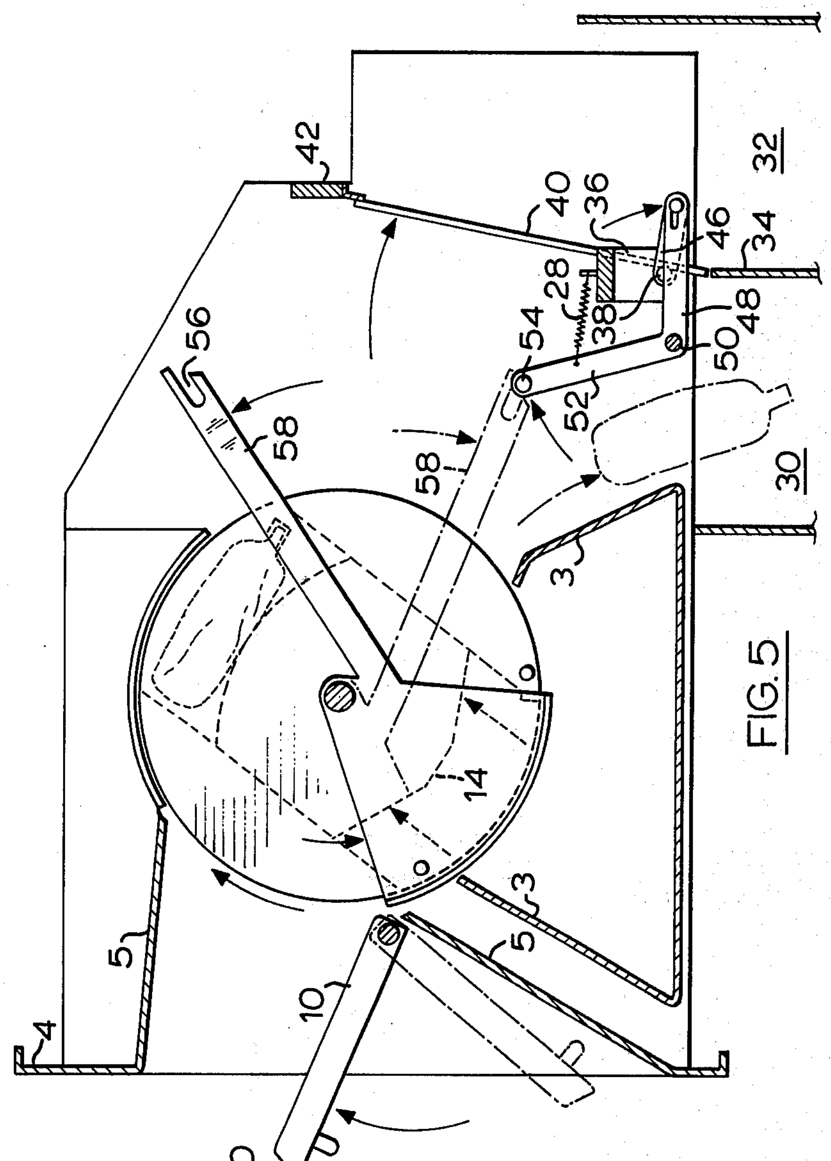

As the shield drops, the arms 58 move upwards and the springs 28 move the pins 54 on the arms 52 clear of the slots 56, permitting the springs to act through the bell crank levers on the levers 46 and to move the plate 40 to the position shown in FIG. 5, in which it closes the entrance 32 to the compartment intended to receive envelopes, and may assist in directing any deposit into the entrance 30.

Figure 4:
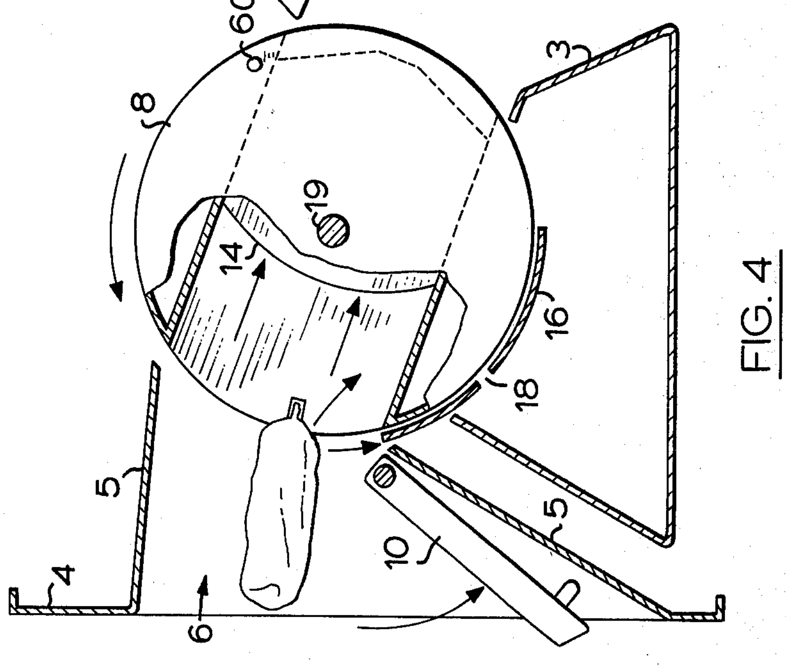

The depository drum 8 is, as mentioned above, operatively linked to the door 10, so that as the door is opened by drawing it downwards to the position shown in FIGS. 2 and 4, the drum rotates, counterclockwise as seen in the drawings, through about 180°, to bring the opening 12 into alignment with the opening 6. On release of the door 10, the drum rotates clockwise through 180° back to its original position so as to discharge the deposit. This action is the same whether envelopes or wallets are beng deposited. However, studs 60 are provided on the ends of the drum 8, disposed so that as the drum 8 returns to its original position after a deposit, the studs pick up flanges 62 on the ends of the shield 16 if this is in its lowered position and return it to its normal position closing the opening 6 so that it may be reengaged by the locking pin 20. It will be understood that the flanges 62 prevent the shield 16 dropping even when unlocked unless the door 10 is lowered, but this is of no practical significance since the opening 12 is not aligned with the opening 6 until the door is lowered. Thus the shield will always close the opening 6 when the opening 12 is facing the deposit receiving compartments.

What we claim is:

1. Safe deposit apparatus comprising means defining an opening through which deposits may be inserted, means for receiving deposits, and means for accepting deposits from said opening and discharging them into said receiving means, wherein a shield is provided mounted for movement relative to said opening defining means between a position substantially obturating said opening except for a limited aperture and a position substantially clear of said aperture, wherein the means for receiving deposits comprises two separate compartments, wherein a diverter member is located at the entrances of said compartments, means being provided operatively linking said diverter member to said shield member whereby the former is moved between positions obturating one or other of the entrances of said compartments when said shield member is moved between its obturating or non-obturating positions relative to said aperture, and wherein the means accepting deposits from the opening and discharging them into said receiving means is a rotary depository drum having a peripheral aperture movable on rotation of the drum to face said aperture or said compartments.

2. Apparatus according to claim 1, wherein said shield is pivotally mounted concentrically with said drum.

3. Apparatus according to claim 2, including key operated lock means normally maintaining said shield in its obturating position, and means on said drum engageable with said shield to move the latter to its obturating position on rotation of the drum to face said compartments.

4. Apparatus according to claim 2, wherein the means operatively linking the diverter member to the shield member comprises linkage means movable between two conditions in which it holds the diverter member in positions obturating respectively one or the other of the entrances of said compartments, spring means biasing said linkage to a first of said conditions, and lever arm means extending from said shield member and engageable with said linkage to move it to the second of said conditions as said shield member is moved to its obturating position.

* * * * *